United States Patent
Base et al.

(10) Patent No.: US 11,060,589 B2
(45) Date of Patent: Jul. 13, 2021

(54) WORK VEHICLE REDUCTION DRIVE ASSEMBLIES CONTAINING HIGH CONTACT RATIO, CONFIGURABLE GEARBOX REDUCTIONS

(71) Applicant: Deere & Company, Moline, IL (US)

(72) Inventors: Douglas S. Base, Coffeyville, KS (US); Dwayne B. Watt, Bartlesville, OK (US)

(73) Assignee: DEERE & COMPANY, Moline, IL (US)

( * ) Notice: Subject to any disclaimer, the term of this patent is extended or adjusted under 35 U.S.C. 154(b) by 83 days.

(21) Appl. No.: 16/668,471

(22) Filed: Oct. 30, 2019

(65) Prior Publication Data

US 2021/0131529 A1 May 6, 2021

(51) Int. Cl.

| | |
|---|---|
| *F16H 3/76* | (2006.01) |
| *B60P 3/06* | (2006.01) |
| *F16H 3/44* | (2006.01) |
| *F16H 57/02* | (2012.01) |

(52) U.S. Cl.
CPC ............... *F16H 3/76* (2013.01); *B60P 3/064* (2013.01); *F16H 2003/442* (2013.01); *F16H 2057/02073* (2013.01)

(58) Field of Classification Search
CPC ............. F16H 3/76; F16H 2057/02073; F16H 2003/442; B60P 3/064
See application file for complete search history.

(56) References Cited

U.S. PATENT DOCUMENTS

| | | |
|---|---|---|
| 4,259,875 A | 4/1981 | Rouverol |
| 6,966,865 B2 | 11/2005 | Drago et al. |
| 8,900,091 B2 * | 12/2014 | Kubota ................. F16H 1/32 475/339 |
| 9,037,346 B2 | 5/2015 | Keys, II et al. |
| 2013/0237368 A1 * | 9/2013 | Zhang .................. F16H 1/46 475/337 |

* cited by examiner

*Primary Examiner* — Justin Holmes
(74) *Attorney, Agent, or Firm* — Klintworth & Rozenblat IP LLP (57) ABSTRACT

A work vehicle reduction drive assembly includes a drive having a drive shaft mechanically linked to a movable work component through a planetary gear train is. The planetary gear train includes a ring gear having a tooth count of $T_{ring}$, a sun gear having a tooth count of $T_{sun}$, and a planet-carrier assembly including a plurality of planet gears each having a tooth count of $T_{planet}$. $T_{ring}$, $T_{sun}$, and $T_{planet}$ are selected such that each planet gear in the plurality of planet gears contacts at least two teeth of the sun gear and at least two teeth of the ring gear in all rotational positions of the planetary gear train. The sum of $T_{ring}$ and $T_{sun}$ yields a positive integer when divided by a first number from a set {3, 4, 5} and when divided by a second number from the set {3, 4, 5}.

20 Claims, 6 Drawing Sheets

WORK VEHICLE REDUCTION DRIVE ASSEMBLIES CONTAINING HIGH CONTACT RATIO, CONFIGURABLE GEARBOX REDUCTIONS

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicle reduction drive assemblies including high contact ratio, configurable gearbox reductions utilized in conjunction with e-machines and other drives utilized to power (or to extract power from) various work vehicle functionalities.

BACKGROUND OF THE DISCLOSURE

E-machines capable of functioning as electric motors and generators are increasingly utilized within work vehicles employed in the agricultural, construction, forestry, and mining industries. In certain instances, such e-machines may function as electric motors serving as the prime mover of a work vehicle, such as an e-crawler and electric compact track loader. In other instances, an e-machine may function as electric motors utilized to provide propulsion assistance to (rather as the prime motive force of) a work vehicle. For example, in this latter case, an e-machine may function as an electric motor providing traction assistance by independently powering an axle of the work vehicle. The work vehicle may be a self-propelled, piloted work vehicle, such as a motor grader. Alternatively, the work vehicle may be a non-self-propelled, non-piloted work vehicle, such as an air seeder, an applicator or sprayer, a commodity card, or another implement towed or otherwise moved by a tractor across a field. In still other instances, a work vehicle may be equipped with an e-machine, which functions as an electrical generator when back-driven by engine or another rotating component of the work vehicle. Regardless of its particular usage, an e-machine is commonly paired with a gearbox reduction further deployed onboard the work vehicle. The gearbox reduction provides a rotational speed reduction, which converts the low torque, high speed rotational output of the e-machine (when serving as an electric motor) to a higher torque, lower speed rotational output better suited for the particular work application in which the e-machine is utilized. Collectively, the combination of an e-machine and a gearbox reduction is referred to herein as an "e-machine reduction drive assembly."

SUMMARY OF THE DISCLOSURE

In various embodiments, a work vehicle reduction drive assembly is utilized onboard a work vehicle having a movable work component. The work vehicle reduction drive assembly includes a high contact ratio, configurable gearbox reduction and a drive. The high contact ratio, configurable gearbox reduction includes, in turn, a gearbox housing within which a planetary gear train is disposed. The planetary gear train contains a ring gear, a sun gear, and a planet-carrier assembly including a plurality of planet gears. The drive is mechanically linked to the movable work component through the planetary gear train when the work vehicle reduction drive assembly is deployed onboard the work vehicle. The ring gear has a tooth count of $T_{ring}$, the sun gear has a tooth count of $T_{sun}$, and the plurality of planet gears each have a tooth count of $T_{planet}$. In implementations, $T_{ring}$, $T_{sun}$, and $T_{planet}$ are selected such that the plurality of planet gears each contact at least two teeth of the sun gear and at least two teeth of the ring gear in all rotational positions of the planetary gear train. Additionally, $T_{ring}$ and $T_{sun}$ are selected such that the sum of $T_{ring}$ and $T_{sun}$ yields a positive integer when divided by a first number from a set $\{3, 4, 5\}$ and when divided by a second number from the set $\{3, 4, 5\}$ different than the first number.

In other embodiments, the work vehicle reduction drive assembly includes a high contact ratio, configurable gearbox reduction and a drive having a drive shaft. The high contact ratio, configurable gearbox reduction includes a gearbox housing and a planetary gear train. The planetary gear train contains: (i) a ring gear having a tooth count of $T_{ring}$, wherein $T_{ring}$ is a prime number exceeding 100; (ii) a sun gear having a tooth count of $T_{sun}$, wherein $T_{sun}$ is greater than 26 and less than $T_{ring}$; and (iii) a planet-carrier assembly including a plurality of planet gears each having a tooth count of $T_{planet}$, wherein $T_{planet}$ combines with $T_{ring}$ and $T_{sun}$ to impart the planetary gear train with a speed reduction ratio exceeding three. The drive shaft is mechanically linked to the movable work component through the planetary gear train when the work vehicle reduction drive assembly is deployed onboard the work vehicle.

The details of one or more embodiments are set-forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set-forth the appended claims.

Overview

As appearing throughout this document, the term "work vehicle reduction drive assembly" refers to an assembly utilized onboard a work vehicle and including gearbox reduction mechanically coupled to the rotatable shaft of a drive device or drive. As further appearing herein, the term "drive device" and the term "drive" are utilized interchangeable in reference to a device or machine capable of generating power in the form of a rotary output when forward driven; and, in certain cases, capable of generating electrical power when back-driven and assuming the form of an e-machine. Examples of drives include hydraulic motors and e-machines functioning as electric motors and/or electric generators. The term "work vehicle reduction e-drive assembly" is further utilized herein to refer to a work vehicle reduction drive in which the drive device assumes the form of an e-machine. Finally, as still further appearing herein, the term "work vehicle" is broadly defined herein to encompass work machines that move (or that are moved) across a work area, crop field, or the like when one or more performing tasks in the agricultural, construction, forestry, or mining industries. The term "work vehicle" thus not only encompasses self-propelled, manned vehicles, but further encompasses work implements and similar work machines that are towed or otherwise moved by another work vehicle (e.g., a tractor) during usage. Generally, then, the work vehicle reduction drive assemblies described herein are highly versatile in nature and can be integrated into a wide variety of work vehicle platforms without limitation.

As e-machine reduction drive assemblies are increasingly utilized onboard work vehicles, certain technical challenges are encountered. One such challenge is encountered when utilizing existing gearbox reductions in conjunction with e-machines (electric motors and generators), which tend to operate at higher speeds and lower torque outputs (or inputs if acting as a generator) than do other types of drives or engines, such as internal combustion engines. At higher rotational speeds, transmission errors within existing gearbox reductions result in relatively high noise levels, which may be perceptible to operators and detract from operator satisfaction. Such high noise levels may be particularly notable when an existing gearbox reduction is paired with an e-machine, which tends to generate relatively little operational noise itself. There exists an industrial demand for e-machine reduction drive assemblies and, more generally, reduction drive assemblies (whether containing an e-machine or another drive device, such as a hydraulic motor) suitable for integration into a wide range of work vehicles and providing low transmission error, low noise operation. Ideally, such a work vehicle reduction drive assembly would also possess other desirable characteristics including, for example, the ability to prolong the operation lifespan of rotating components (e.g., bearings) within the drive assembly. It would also be desirable for such a reduction drive assembly to be amenable to low cost manufacture and to provide a high level of design flexibility.

In satisfaction of the above-described industrial demand, the following discloses work vehicle reduction drive assemblies including high contact ratio, configurable gearbox reductions. The high contact ratio achieved by the below-described gearbox reductions minimize transmission errors to provide exceptionally quiet operation, particularly when the reduction drive assembly contains a drive in the form of an e-machine. The gearbox reductions are referred as having "high contact ratios" due to the inclusion of planetary gear trains or sets, which have contact ratios (CRs) exceeding 2. This high contact ratio (CR>2) denotes that at least two teeth of any given gear within the planetary gear train contact at least teeth of each meshing gear across in all rotational positions of the gear train. Such a high contact ratio is realized, in part, by adhering to certain key design rules or fundamental relationships between the tooth count of at least one ring gear ($T_{ring}$) included in the planetary gear train, the tooth count of at least one sun gear ($T_{sun}$) included in the gear train, and the tooth count each planet gear of a planet-carrier assembly ($T_{planet}$) further included within the gear train. The ring gear is selected to have an ultra-high tooth count ($T_{ring}$) exceeding 100 in embodiments. $T_{ring}$ may also be selected as a prime number and, at least some embodiments, may be selected from the number set {113, 119, 121, 127, 131, 137, 139} for reasons explained below. Comparatively, the sun gear may be selected to have a tooth count ($T_{sun}$) based upon $T_{ring}$ such that the following mathematical relationship is satisfied: the sum of $T_{ring}$ and $T_{sun}$ yields a positive integer or whole number when divided by a first number from a set {3, 4, 5} and when divided by a second number from the set {3, 4, 5} different than the first number. In certain cases, the sum of $T_{ring}$ and $T_{sun}$ may yield a positive integer when divided by all three numbers from the set {3, 4, 5}.

Selecting the $T_{ring}$ and $T_{sun}$ in accordance with the foregoing design principals, and further selecting a corresponding value for $T_{planet}$ (described below), enables the gearbox reduction to achieve a high contact ratio such that at least two teeth of each gear contacts at least two teeth of each meshing gear in all planetary gear positions, as noted above. Again, this yields a planetary gear train having exceptionally low transmission errors and quiet operation. While imparting the gears with higher tooth counts may reduce the structural robustness of the teeth, this is typically acceptable in the context of e-machine (or hydraulic motor) drives that tend to operate at higher speeds and lower torque levels. Additionally, stress concentrations applied to the gear teeth are also reduced due to the increased load sharing between the gear teeth at the various gear-to-gear or mesh interfaces of the planetary gear drive. Further, by following the design principals disclosed herein, the high contact ratio of the gearbox reduction and, specifically, the planetary gear train can be achieved utilizing spur gears (that is, gears lacking a helix angle relative to the gear rotational axis) as the ring gear(s), sun gear(s), and planet gears of the planetary gear train. The usage of spur gears may not only reduce manufacturing costs, but may further minimize thrust loads exerted on the rolling element bearings (and other rotating components) within the gearbox reduction. The operational lifespan of the gearbox reduction may be prolonged as a result.

As a further benefit, selecting the respective tooth counts of the ring and sun gears such that that the sum of $T_{ring}$ and $T_{sun}$ yields a positive integer when divided by at least two numbers from the set {3, 4, 5} imparts the gearbox reduction with a configurable or modular design. The gearbox reduction is "configurable" in the sense that, when $T_{ring}$ and $T_{sun}$ are selected to satisfy this condition, the ring gear and the sun gear permit compatibility with multiple planet-carrier assemblies having varying planet gear counts and similar critical dimensions (e.g., evenly-spaced planet gears). Specifically, in instances in which the sum $T_{ring}$ and $T_{sun}$ yields an integer when divided by three, a planet-carrier assembly having three planet gears can be assembled with the ring gear and the sun gear. Comparatively, in instances in which the sum $T_{ring}$ and $T_{sun}$ yields an integer when divided by four, a planet-carrier assembly having four planet gears can be assembled with the ring gear and the sun gear. Finally, in instances in which the sum $T_{ring}$ and $T_{sun}$ yields an integer when divided by five, a planet-carrier assembly having five planet gears can be assembled with the ring gear and the sun gear. Thus, by selecting the tooth counts of the ring and sun gears such that that the sum of $T_{ring}$ and $T_{sun}$ yields a positive integer when divided by at least two numbers from the set {3, 4, 5}, as set-out above, multiple planet-carrier assemblies having different numbers of planet gears (ranging from three planet gears to five planet gears, inclusive) can be interchanged with the ring and sun gears within the gearbox housing, providing the critical dimensions of the planet-carrier assemblies remain substantially consistent. This imparts the gearbox reduction with an interchangeable or configurable design to afford manufacturers and customers with an enhanced design flexibility in selecting a particular planet gear set or module to satisfy a particular application; e.g., for higher torque applications, a planet-carrier assembly having four or five gears may be selected, while utilizing a base subassembly containing a common ring and/or sun gear. Additionally, by utilizing common ring and sun gears for multiple gearings configurations, cost savings may be achieved through economies of scale, while the gearbox assembly process may be streamlined.

Additional critical relationships between $T_{ring}$, $T_{sun}$, and $T_{planet}$ are further disclosed. For example, in embodiments, $T_{ring}$, $T_{sun}$, and $T_{planet}$ are selected such the ring gear, the sun gear, and the planet gears follow a hunting pattern during operation of the work vehicle reduction drive assembly. The phrase "follow a hunting pattern," the term "hunting behavior," and the term "hunt," as appearing throughout this document, indicates that each tooth of a given gear within the planetary gear train will contact or "hunt out" all teeth of a meshing gear over time across the rotational positions of the planetary gear train. Therefore, selecting $T_{ring}$, $T_{sun}$, and $T_{planet}$ such that ring gear, the sun gear, and the planet gears follow a hunting pattern ensures that all gear teeth (rather than a subset of gear teeth) at the sun-to-planet interfaces and at the planet-to-ring interfaces come into contact through the assembly phases of the planetary gear train to minimize gear wear and further prolong the service lifespan of the gearbox reduction. In many instances, $T_{ring}$, $T_{sun}$, and $T_{planet}$ are each selected as a prime number to impart the planetary gear train with such a hunting behavior at each of the gear-to-gear or mesh interfaces. In other implementations, $T_{ring}$ may be selected as a prime number (e.g., $T_{ring}$ may be selected from the above-mentioned number set {113, 119, 121, 127, 131, 137, 139}), while $T_{sun}$ and $T_{planet}$ are selected to have values that, while not being prime numbers, are divisible by different factors; e.g., in one non-limiting embodiment $T_{ring}$, $T_{sun}$, and $T_{planet}$ may be equal to 137, 58, and 39, respectively. This again ensures that the planetary gear train follows a hunting pattern during operation of the gearbox reduction.

Still further benefits are achieved by embodiments of the high contact ratio, configurable gearbox reduction contained in the work vehicle reduction drive assemblies disclosed herein. For example, in certain instances, the sun gear and the planet gears may be manufactured utilizing a single hob or similar cutting tool for additional cost savings. In other implementations, the gearbox reduction may be imparted with a relatively compact design, with the ring gear potentially having an inner diameter (as measured at the tooth roots) ranging from about 127 millimeters to about 305 millimeters in embodiments. Additionally or alternatively, in various implementations, the gearbox reduction may achieve a speed reduction ratio greater than 3; and, in certain instances, such as when a multi-stage planetary gear train is utilized, the speed reduction may approach if not exceed 6. Such characteristics again render the gearbox reduction well-suited for usage with e-machines, which tend to produce high speed, low torque rotational outputs (when utilized as electric motors). Additionally, in embodiments, the work vehicle reduction drive assembly may assume the form of a so-called "pi drive assembly," which is defined herein as a drive assembly containing a gearbox reduction having a speed reduction ratio substantially equivalent to pi; the term "substantially equivalent to pi" further defined herein as pi±5%. Given this speed reduction ratio, such a pi drive assembly is well-suited for usage in place of conventional hydraulic motor, with the pi drive assembly containing an e-machine in addition to a high contact ratio, configurable gearbox of the type mentioned above and described in detail below.

Figure 3:
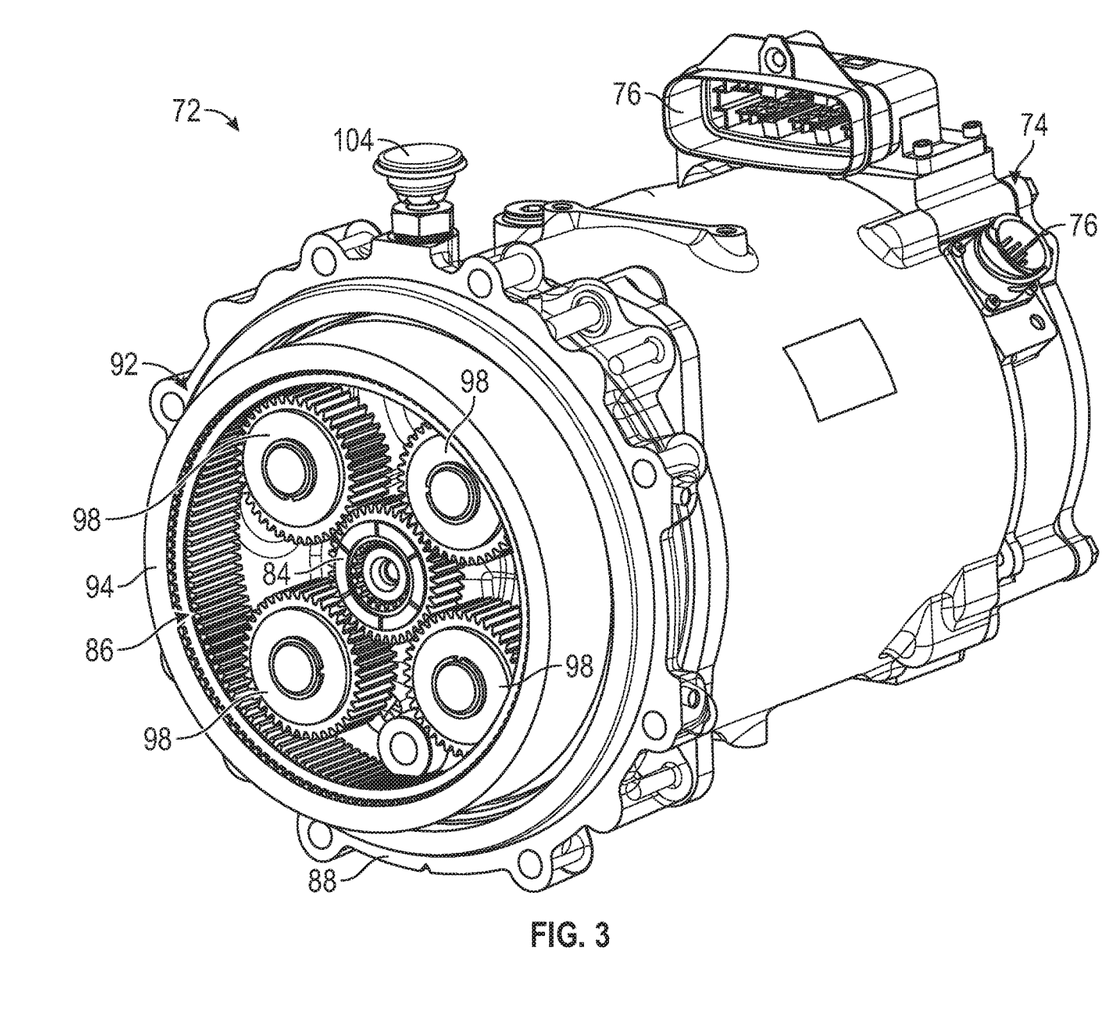
FIGS. 3 and 4 are isometric and partial cross-sectional views, respectively, of a first example implementation of the generalized work vehicle reduction drive assembly shown in FIG. 1 including a high contact ratio, configurable gearbox reduction containing a single stage planetary gear train.
Figure 4:
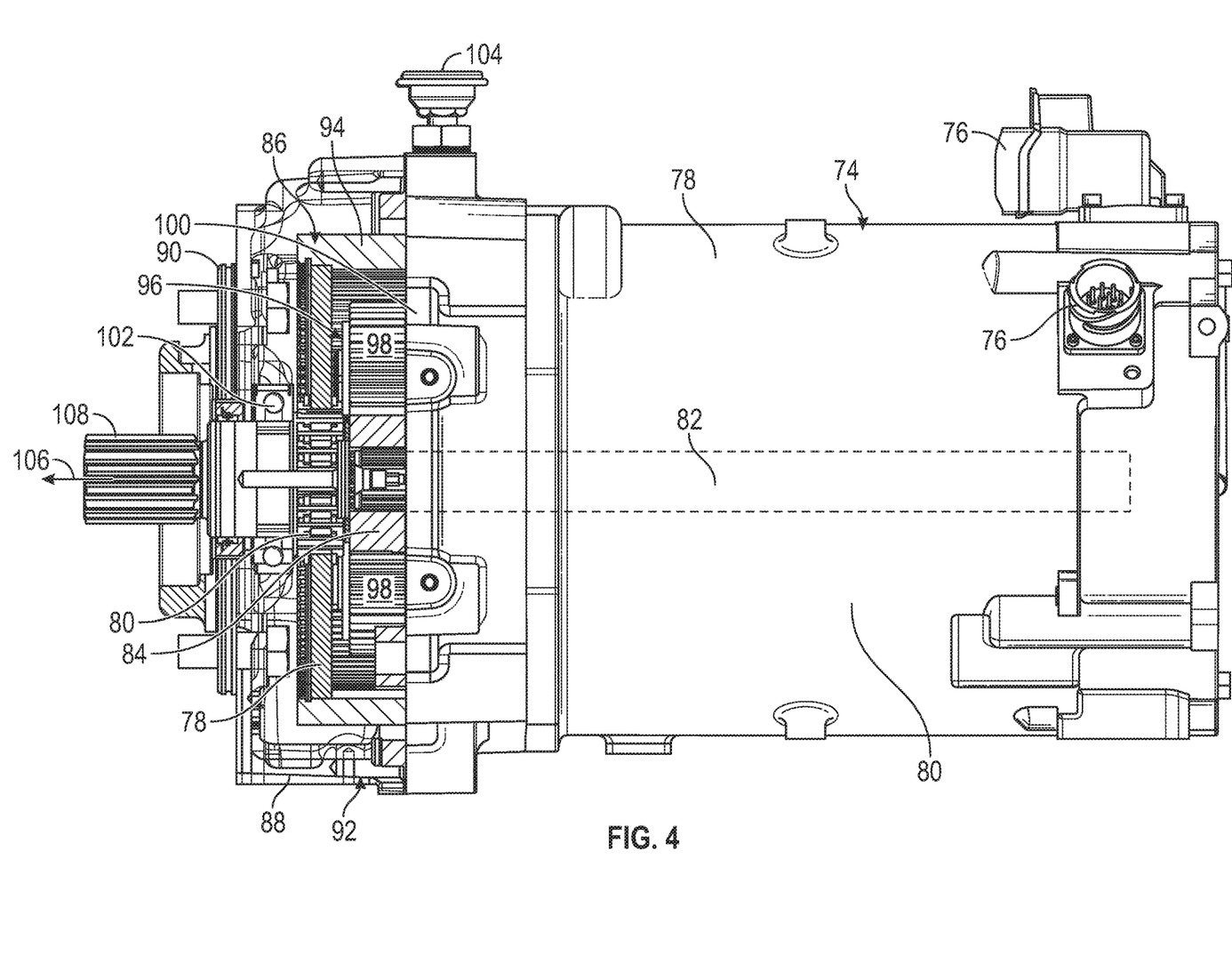

A generalized example of the work vehicle reduction drive assembly is described below in connection with FIG. 1. Following this, examples of various works vehicles into which embodiments of the reduction drive assembly may be integrated or incorporated are described below in connection with FIG. 2. Lastly, a first example implementation of the work vehicle reduction drive assembly is shown in FIGS. 3 and 4 further described below, while a second example implementation of the work vehicle reduction drive assembly is shown and discussed in conjunction with FIGS. 5 and 6. The following description is provided by way of non-limiting illustration only and should not be construed to unduly restrict the scope of the appended Claims in any manner.

Figure 1:
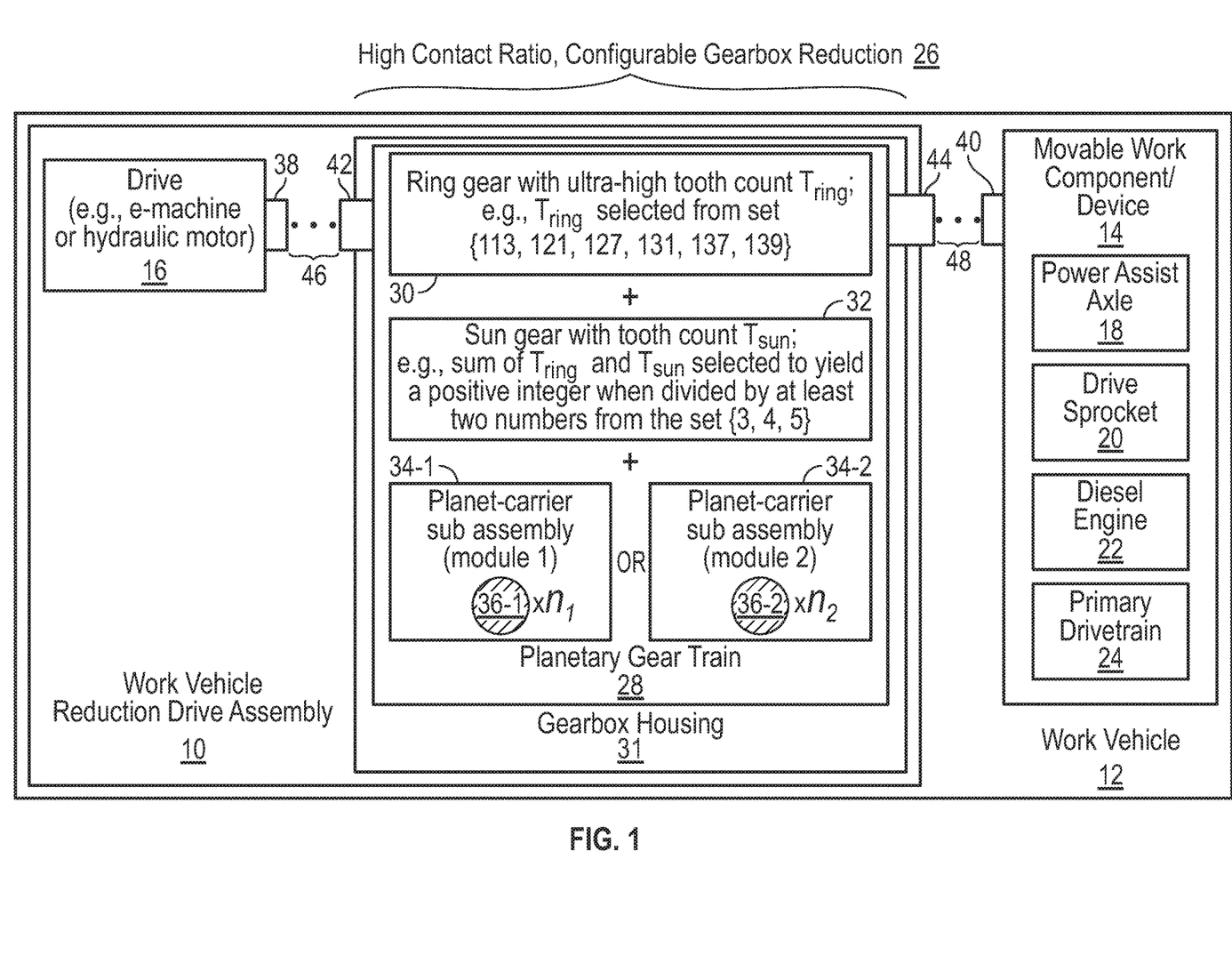
FIG. 1 is a schematic of a generalized work vehicle reduction drive assembly including a high contact ratio, configurable gearbox reduction and deployed onboard a work vehicle, as illustrated in accordance with an example embodiment.

Example Vehicle Reduction Drive Assemblies Containing a High Contact Ratio, Configurable Gearbox Reductions Referring to FIG. 1, a generalized schematic of an example work vehicle reduction drive assembly 10 onboard a work vehicle 12 is presented. The work vehicle reduction drive assembly 10 is depicted in a highly generalized manner in FIG. 1 to emphasize that embodiments of the work vehicle reduction drive assembly 10 can be integrated into various types of work vehicles and utilized to power (or to receive power from) different movable work components or devices supporting various work vehicle functionalities. In this regard, the example work vehicle 12 is schematically depicted as containing at least one movable component or device 14, which is mechanically linked to (that is, is able to exchange rotary power with) a drive 16, such as an e-machine or a hydraulic motor, contained in the work vehicle reduction drive assembly 10. The movable work component or device 14 can assume the form of (or may be included within) a power assist axle 18, a drive sprocket 20 (e.g., as included in the tracked undercarriage of a crawler work vehicle), a diesel engine 22, or a primary drivetrain 24 of the work vehicle 12, to list but a few non-limiting examples.

Explaining the foregoing sentence more fully, in embodiments in which the work vehicle 12 assumes the form of a piloted work vehicle (e.g., a motor grader) or a non-piloted work vehicle (e.g., a wheeled implement towed by or otherwise moved by a tractor), the movable work component or device 14 may assume the form of an independently powered axle or "power assist axle 18," which is driven by the work vehicle reduction drive assembly 10 to provide assistive traction to the work vehicle 12. In embodiments in which the work vehicle 12 assumes the form of an e-crawler, the movable work component 14 may assume the form of a drive sprocket included in a tracked undercarriage driven by the work vehicle reduction drive assembly 10. In further embodiments in which the work vehicle 12 contains a diesel engine, such as the diesel engine 22 schematically identified in FIG. 1, the rotating components of the diesel engine 22 may be driven by work vehicle reduction drive assembly 10 upon engine startup and/or the drive 16 may function as an electric generator when driven by the diesel engine 22 subsequent to engine startup. Finally, as a still further example, the drive 16 may power the primary drivetrain 24 of the work vehicle 12 when the work vehicle 12 assumes the form of a wheeled loader, a compact track loader, or another work vehicle. Notably, in each of the example applications 18, 20, and 24, the work vehicle reduction drive assembly 10 propels or helps propel the work vehicle 12 during operation thereof. Thus, in such applications, the drive 16 may alternatively be described as mechanically linked to a propulsive element (e.g., a wheeled axle or track) of the work vehicle 12 through the gearbox reduction 26.

Again, the foregoing examples are non-limiting, and the work vehicle reduction drive assembly 10 is amenable to integration into a wide variety of work vehicles utilized to perform various tasks in the construction, agricultural, mining, and forestry industries. Further, while in many instances the work vehicle reduction drive assembly 10 will be utilized to provide motive force propelling or helping to propel the work vehicle 12 when moving over terrain, this need not always be the case; e.g., when the drive 16 is utilized to assist in starting the diesel engine 22 and/or in generating power from the diesel engine 22 (or another rotating component targeted for energy recovery or harvesting). The drive 16 will often assume the form of an e-machine, which acts as an electric motor, an electric generator, or both during operation of the work vehicle reduction drive assembly 10. In addition to the drive 16, the work vehicle reduction drive assembly 10 further includes a high contact ratio, configurable gearbox reduction 26. For reasons explained below, the high contact ratio, configurable gearbox reduction 26 provides low transmission error, low noise operation due, at least in part, to the high contact ratio achieved by a planetary gear set or train 28 (described below) disposed within the gearbox reduction 26. Additionally, in at least some embodiments, the gearbox reduction 26 achieves relatively deep (high value) speed reduction ratios approaching, if not exceeding 3 in many instances. These and other characteristics of the gearbox reduction 26 render the high contact ratio, configurable gearbox reduction 26 well-suited for usage in conjunction with e-machines, which tend to provide low noise operation at higher rotational rates (at which conventional gearboxes produce undesirably high noise levels). This notwithstanding, the drive 16 need not assume the form of an e-machine in all instances; e.g., in certain implementations, the drive 16 may assume the form of a hydraulic motor included in, for example, a hydrostatic transmission.

As previously noted, the high contact ratio, configurable gearbox reduction 26 includes a planetary gear train 28 contained in a gearbox casing or housing 31. The planetary gear train 28 includes, in turn, at least one ring gear 30, at least one sun gear 32, and at least one planet-carrier subassembly 34. For purposes of illustration, two such planet-carrier subassembly 34 are contained in the box representative of the planetary gear train 28 in FIG. 1 and identified as planet-carrier subassembly 34-1 and planet-carrier subassembly 34-2. The planet-carrier subassemblies 34-1, 34-2 are depicted in this manner to emphasize that subassemblies 34-1, 34-2 represent different interchangeable part or module options. As further graphically indicated, the planet-carrier subassembly 34-1 includes a first predetermined number (n1) of planet gears 36-1, while the planet-carrier subassembly 34-2 includes a second predetermined number (n2) of planet gears 36-2. The planet-carrier subassemblies 34-1, 34-2 each have between three and five planet gears, inclusive, while containing a different number of planet gears. Stated differently, n1 and n2 are both selected from the number set $\{3, 4, 5\}$, while n1 is different than n2 (n1≠n2).

The interchangeable nature of the planet-carrier subassemblies 34-1, 34-2 provides the gearbox reduction 26 with its configurable design; that is, the gearbox reduction 26 is configured such that at least two (and possibly three or more) different planet-carrier subassemblies 34 having different numbers of planet gears can be utilized in conjunction with the ring gear 30 and the sun gear 32. To enable such interchangeability or modularity, certain mathematical relationships or design rules are observed between the tooth count of the ring gear 30 ($T_{ring}$) and the tooth count of the sun gear 32 ($T_{sun}$), as mentioned above and as discussed in more detail below. Additionally, aside from variances in the tooth count of the individual planet gears contained in the planet-carrier subassemblies 34 ($T_{planet}$), critical dimensions (e.g., the planet gear dimensions and spacing from the rotational axis of the carrier) are maintained between the different subassemblies 34 to allow any chosen subassembly 34 to assemble with the ring gear 30 and the sun gear 32 of the planetary gear train 28. Finally, while only two modules or subassemblies 34 are shown in FIG. 1, three or more modules (e.g., first, second, and third subassembly modules containing three, four, and five planet gears, respectively) may be interchangeably utilized with the ring gear 30 and the sun gear 32 in embodiments, depending upon the selected values for $T_{ring}$ and $T_{sun}$ (discussed below). In certain implementations, the gearbox housing 31 and the ring gear 30 may be designed such that different planet-carrier subassemblies 34-1, 34-2 can be "plugged-in" or assembled in a relatively straightforward, modular manner. In such implementations, the sun gear 32 may be included as part of the base module (further containing the ring gear 30 and the gearbox housing 31) or, instead, the sun gear 32 may be included as part of a "plug-in" or readily-insertable module in addition to the planet-carrier subassemblies 34-1, 34-2.

In addition to having a configurable design permitting different sets of planet gears to be interchanged, the gearbox reduction 26 further features a high contact ratio between the mesh or gear-to-gear interfaces of the planetary gear train 28. As indicated above, the term "high contact ratio" denotes a contact ratio in which at least two teeth of each gear contact at least two teeth of each meshing gear of the gearbox reduction 26 in all rotational positions of the planetary gear train 28. Stated differently, in all rotational positions of the planetary gear train 28, at least two teeth each planet gear 36 of the selected planet-carrier subassembly 34 contacts at least two teeth of the ring gear 30 and at least two teeth of each planet gear 36 further contacts at least two teeth of the sun gear 32. This results in exceptionally low transmission errors and quiet operation of the gearbox reduction 26. Additionally, in embodiments, gearbox reduction 26 may provide a speed reduction ratio exceeding three; and, perhaps, a speed reduction ratio exceeding 6 when a compound gear set is utilized as the planetary gear train 28, as described more fully below in connection with FIGS. 5 and 6. To permit such a high contact ratio, the ring gear 30 will often (although need not always) have an ultra-high tooth count ($T_{ring}$) exceeding 100, which is well-above the tooth count of many conventional ring gears. Further, in many embodiments, the ring gear 30 is selected to have an ultra-high tooth count ($T_{ring}$>100) and a tooth count ($T_{ring}$) equal to a prime number, for reasons further explained below. Concurrently, the ring gear 30 may have an inner diameter (as measured at the tooth roots) ranging from about 127 millimeters to about 305 millimeters in embodiments.

As indicated above, the drive 16 of the work vehicle reduction drive assembly 10 can drive and/or may be driven by the movable work component 14 through the gearbox reduction 26. Generally, the drive 16 includes a rotatable drive shaft 38, which is mechanically linked to a rotatable shaft 40 of the movable work component 14 (hereafter, "component shaft 40") through the rotational component within the gearbox housing 31. Accordingly, the gearbox reduction 26 provides a rotary power transmission arrangement between the shafts 38, 40 and includes a first rotatable input/output (I/O) member 42 and a second I/O member 44, which may also be splined shafts or other rotatable structures suitable for transmitting rotational motion to and from selected gears within the planetary gear train 28. The first rotatable I/O member 42 is mechanically linked to the drive shaft 38, either directly or indirectly through any number of intervening components, as indicated by ellipses 46 in FIG. 1. Similarly, the second rotatable I/O member 44 is mechanically linked to the component shaft 40, either directly or indirectly through one or more intervening components (indicated by ellipses 48). In an example scenario in which the drive 16 powers the movable work component 14 through the gearbox reduction 26, rotation of the drive shaft 38 results in rotation of the I/O member 42 (here, functioning as the mechanical input of the gearbox reduction 26). This causes rotation of a first component of the planetary gear train 28 (e.g., one of the ring gear 30, the sun gear 32, or the planet-carrier subassembly 34), which drives rotation of at least one a second component of the planetary gear train 28 (e.g., a different one of the ring gear 30, the sun gear 32, or the planet-carrier subassembly 34). This, in turn, drives rotation of the I/O member 44 (here, functioning as the mechanical output of the gearbox reduction 26) to then co-rotate component shaft 40 and power the movable work component 14. The rotational power flow just described is reversed when the movable work component 14 instead powers the drive 16 through the gearbox reduction 26; e.g., as when the drive 16 is an electric motor serving as a generator-starter, and the movable work component 14 assumes the form of the diesel engine 22 following engine startup.

Regardless of the particular force transmission path and direction through the high contact ratio, configurable gearbox reduction 26, the work vehicle reduction drive assembly 10 provides several notable advantages. Two primary advantages achieved by the gearbox reduction 26 have already been mentioned; namely, the configurable nature of the gearbox reduction 26 and the high contact ratio achieved by the planetary gear train 28. Both of these advantages are realized, in part, by selecting $T_{ring}$ to have a high tooth count, such as an ultra-high tooth count exceeding 100. However, it is also desirable to limit the tooth count of $T_{ring}$ to numbers less than an upper threshold to, for example, maintain the structural integrity of the ring gear 30 and to preserve the manufacturability of the ring gear 30. Additionally, the planetary gear train 28 is advantageously configured to hunt, which is achieved, in part, by selecting $T_{ring}$ to be prime number. Consider these competing factors, along with the other factors described below (e.g., the desirability of the planetary gear train to hunt), $T_{ring}$ is advantageously selected from the following number set in embodiments: {113, 119, 121, 127, 131, 137, 139}. Concurrently, and as indicated above, $T_{ring}$ and $T_{sun}$ are beneficially selected to impart the gearbox reduction 26 with a configurable or modular design and, specifically, to enable both the planet-carrier subassembly 34-1 (having a first number of planet gears between three and five) and the planet-carrier subassembly 34-2 (having a second, different number of planet gears between three and five) to assemble with the ring gear 30 and the sun gear 32. Consequently, in embodiments, after $T_{ring}$ is selected from the number set above, $T_{sun}$ is then selected to such that the sum of $T_{ring}$ and $T_{sun}$ yields a positive integer when divided by at least two numbers (and possibly all three numbers) from the set {3, 4, 5}. Notably, only a limited number of numerous gear combinations satisfy these specific requirements, as set-forth in TABLES 1A through 1G appearing below.

TABLE 1A

VALUES OF $T_{SUN}$ PERMITTING MODULARITY WHEN $T_{ring}$ = 113

| $T_{sun}$ | 3-Planet | 4-Planet | 5-Planet |
| --- | --- | --- | --- |
| 27 | | X | X |
| 31 | X | X | |
| 37 | X | | X |
| 43 | X | X | |
| 47 | | X | X |
| 52 | X | | X |
| 55 | X | X | |

TABLE 1B

VALUES OF $T_{SUN}$ PERMITTING MODULARITY WHEN $T_{ring}$ = 119

| $T_{sun}$ | 3-Planet | 4-Planet | 5-Planet |
| --- | --- | --- | --- |
| 31 | X | | X |
| 37 | X | X | |
| 41 | | X | X |
| 46 | X | | X |
| 49 | X | X | |

TABLE 1C

VALUES OF $T_{SUN}$ PERMITTING MODULARITY WHEN $T_{ring}$ = 121

| $T_{sun}$ | 3-Planet | 4-Planet | 5-Planet |
| --- | --- | --- | --- |
| 29 | X | | X |
| 35 | X | X | |

TABLE 1C-continued

VALUES OF $T_{SUN}$ PERMITTING MODULARITY WHEN $T_{ring} = 121$

| $T_{sun}$ | 3-Planet | 4-Planet | 5-Planet |
|---|---|---|---|
| 39 |  | X | X |
| 44 | X |  | X |
| 47 | X | X |  |

TABLE 1D

VALUES OF $T_{SUN}$ PERMITTING MODULARITY WHEN $T_{ring} = 127$

| $T_{sun}$ | 3-Planet | 4-Planet | 5-Planet |
|---|---|---|---|
| 29 | X | X |  |
| 33 |  | X | X |
| 38 | X |  | X |
| 41 | X | X |  |
| 53 | X | X | X |

TABLE 1E

VALUES OF $T_{SUN}$ PERMITTING MODULARITY WHEN $T_{ring} = 131$

| $T_{sun}$ | 3-Planet | 4-Planet | 5-Planet |
|---|---|---|---|
| 29 |  | X | X |
| 34 | X |  | X |
| 37 | X | X |  |
| 49 | X | X | X |

TABLE 1F

VALUES OF $T_{SUN}$ PERMITTING MODULARITY WHEN $T_{ring} = 137$

| $T_{sun}$ | 3-Planet | 4-Planet | 5-Planet |
|---|---|---|---|
| 28 | X |  | X |
| 31 | X | X |  |
| 43 | X | X | X |
| 55 | X | X |  |
| 58 | X |  | X |

TABLE 1G

VALUES OF $T_{SUN}$ PERMITTING MODULARITY WHEN $T_{ring} = 139$

| $T_{sun}$ | 3-Planet | 4-Planet | 5-Planet |
|---|---|---|---|
| 29 | X | X |  |
| 41 | X | X | X |
| 53 | X | X |  |
| 56 | X |  | X |

As indicated in TABLE 1A above, the desired interchangeability or modularity (that is, the ability of the gearbox reduction 26 to accept multiple plant-carrier subassemblies having different planet gear counts ranging from three to five planet gears, inclusive) may be achieved by selecting $T_{sun}$ from the number set {27, 31, 37, 43, 47, 52, 55} in embodiments in which $T_{ring}$ is equal to 113. TABLE 1B indicates that the desired modularity may be achieved by selecting $T_{sun}$ from the number set {31, 37, 41, 46, 49} in embodiments in which $T_{ring}$ is equal to 119. Next, TABLE 1C indicates that the desired modularity may be achieved by selecting $T_{sun}$ from the number set {29, 35, 39, 44, 47} in embodiments in which $T_{ring}$ is equal to 121. TABLE 1D demonstrates that the desired modularity may be achieved by selecting $T_{sun}$ from the number set {29, 33, 38, 41, 53} in embodiments in which $T_{ring}$ is equal to 127. TABLE 1E indicates that the desired modularity may be achieved by selecting $T_{sun}$ from the number set {29, 34, 37, 49} in embodiments in which $T_{ring}$ is equal to 131. TABLE 1F indicates that the desired modularity may be achieved by selecting $T_{sun}$ from the number set {28, 31, 43, 55, 58} in embodiments in which $T_{ring}$ is equal to 137. TABLE 1G indicates that the desired modularity may be achieved by selecting $T_{sun}$ from the number set {29, 41, 53, 56} in embodiments in which $T_{ring}$ is equal to 139. More generally, it may be stated that, in embodiments of the work vehicle reduction drive assembly 10, $T_{ring}$ is selected from the set {113, 119, 121, 127, 131, 137, 139}, while $T_{sun}$ is selected from the set {27, 28, 29, 31, 33, 34, 35, 37, 38, 39, 41, 43, 44, 46, 47, 49, 52, 53, 55, 56, 58}. In other embodiments, $T_{ring}$ may be selected as a prime number exceeding 100, while $T_{sun}$ is selected to be greater than 26 and less than $T_{ring}$.

By selecting $T_{ring}$ and $T_{sun}$ such that the gearbox reduction 26 is compatible with multiple plant-carrier subassemblies having different planet gear counts, manufacture of the work vehicle reduction drive assembly 10 may be streamlined. Common ring gears and sun gears can be utilized in different implementations to achieve economies of scale and lower manufacturing cost. Design flexibility is afforded as a base subassembly including a single ring gear and, perhaps, a single sun gear can be provided and receive interchangeable planet-carrier assemblies having varying number of planet gears, thereby allowing the manufacturer (or other entity) to select a higher planet gear count when, for example, it is desired to increase the torque-handling capabilities of the gearbox reduction 26. Additionally, high contact ratios may be achieved, while the ring gear 30, the sun gear 32, and the planet gears 36 assume the form of non-helical spur gears to further lower manufacturing costs, while reducing thrust loads (or other desirable force vectors) on other components within the high contact ratio, configurable gearbox reduction 26. This may be particularly beneficial in prolonging the longevity of rolling element bearings, such as roller or ball bearings, disposed between the static infrastructure of the housing 31 and the rotating components contained therein.

In addition to selecting $T_{ring}$ and $T_{sun}$ to provide the above-described interchangeability or modularity, $T_{ring}$ and $T_{sun}$ (along with $T_{planet}$) are also advantageously selected to ensure that the various meshing gears of the planetary gear train 28 hunt during operation. To this end, $T_{ring}$ is advantageously selected as a prime number exceeding 100 and, perhaps, is elected from the above-mentioned number set {113, 119, 121, 127, 131, 137, 139}. Further, and as may be gathered from reference to TABLES 1A through 1G above, $T_{sun}$ may also be selected as a prime number in many instances. So too may $T_{planet}$ be selected as a prime number (along with $T_{ring}$ and $T_{sun}$) in embodiments to ensure the planetary gear train 28 follows a hunting pattern during usage. It is, however, also possible for any or all of $T_{ring}$, $T_{sun}$, and $T_{planet}$ to be selected as non-prime numbers in at least some implementations of the gearbox reduction 26. For example, in certain embodiments, $T_{ring}$ may be selected as a prime number exceeding 100 (e.g., $T_{ring}$ may be selected from the number set {113, 119, 121, 127, 131, 137, 139}), while one or both of $T_{sun}$ and $T_{planet}$ are selected as non-prime numbers, but with are not divisible by a common factor (while yielding an integer or whole number) to achieve the desired hunting behavior of the planetary gear train 28. To provide a more specific, albeit non-limiting example, $T_{ring}$, $T_{sun}$, and $T_{planet}$ may be equal to 137, 58, and 39, respectively, in embodiments to impart the planetary gear train 28 with the desired modularity, high contact ratio, and hunting behavior.

In embodiments, the planetary gear train 28 achieves a speed reduction ratio approaching, if not exceeding 3. The speed reduction ratio of the planetary gear train 28 will depend not only on the values of $T_{ring}$, $T_{sun}$, and $T_{planet}$, but further on which members of the planetary gear train 28 serve as the mechanical input and output of the gear train 28, as well as whether the planetary gear train 28 has a single stage or a multi-stage design. As appearing below, TABLE 2 sets-forth example speed ratio reductions that may be achieved when $T_{ring}$ is selected as 137 and other conditions described above are also satisfied. As can be seen in TABLE 2, most combinations of $T_{ring}$, $T_{sun}$, and $T_{planet}$ achieve speed reduction ratios exceeding 3; and, in certain cases, exceeding 5. The speed reduction ratio of the gearbox reduction 26 can also be increased in embodiments by imparting the planetary gear train 28 with a multi-stage design, as described below in connection with FIGS. 5 and 6. Finally, it may be noted that the second set-forth in TABLE 2 below ($T_{ring}$=137, $T_{sun}$=43, $T_{planet}$=47, with the sun gear 32 serving as the mechanical input of the gear train 28 and the ring gear 30 serving as the mechanical output), the gearbox reduction 26 is well-suited for usage as a pi drive (in which case, the drive 16 may assume the form of an e-machine).

TABLE 2

EXAMPLE REDUCTION RATIOS WHEN $T_{RING}$ = 137

| | Example 1 | Example 2 | Example 3 | Example 4 |
|---|---|---|---|---|
| $T_{sun}$ | 31 | 43 | 58 | 27 |
| $T_{planet}$ | 53 | 47 | 39 | 55 |
| Speed Reduction Ratio (Sun In, Ring Out) | 4.4194 | 3.1860 | 2.3621 | 5.0741 |
| Speed Reduction Ratio (Sun In, Carrier Out) | 5.4194 | 4.1860 | 3.3621 | 6.0741 |

Figure 2:
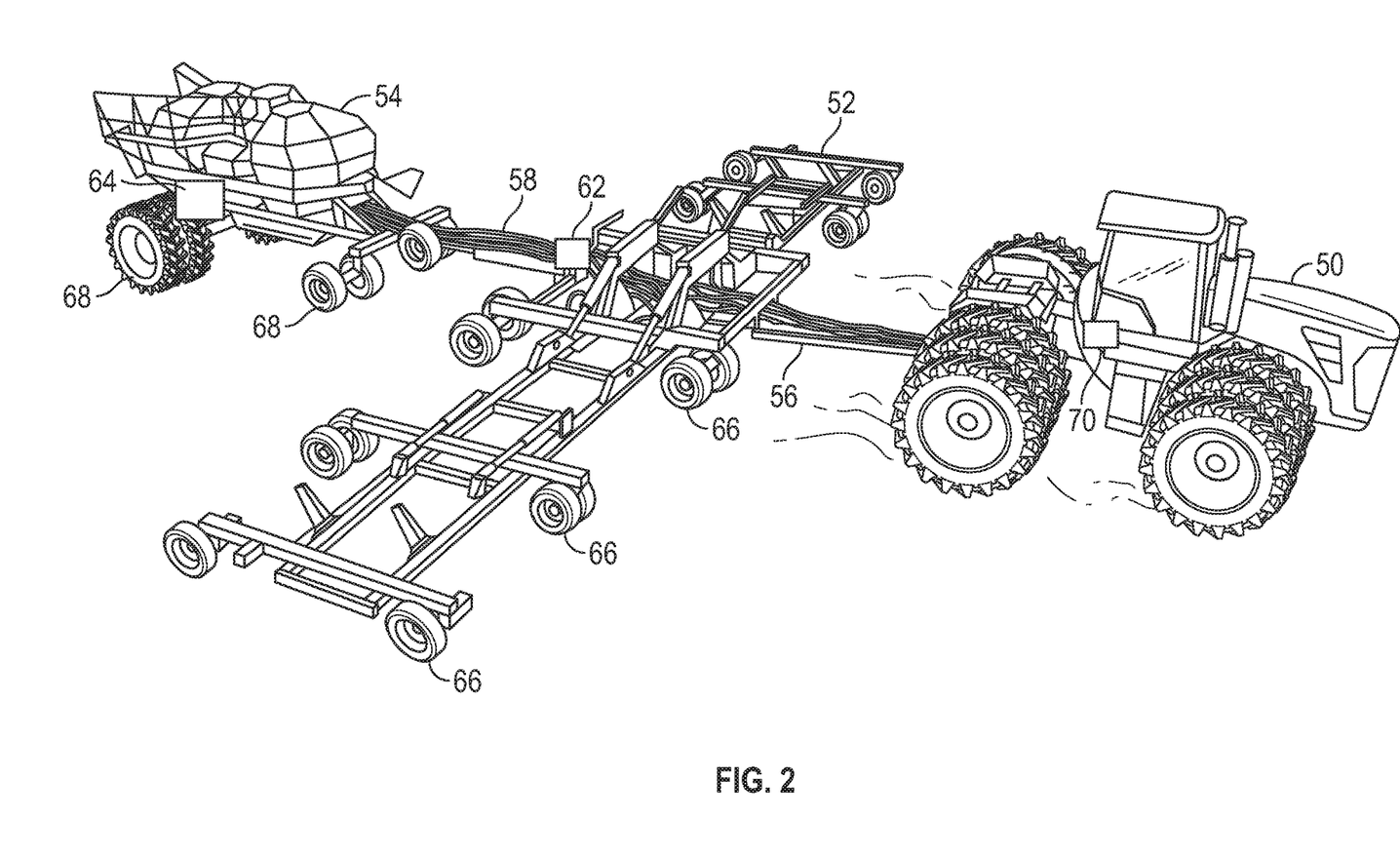
FIG. 2 is a perspective view of three example work vehicles (here, a tractor, an air speeder or applicator, and a commodity cart), any or all of which may be equipped with embodiments of the work vehicle reduction drive assembly shown in FIG. 1.

Progressing next to FIG. 2, there is shown is a perspective view of three example work vehicles 50, 52, 54, any or all of which may be equipped with embodiments of the work vehicle reduction drive assembly 10 shown in FIG. 1. Specifically, a tractor 50 is shown in tow arrangement with a work implement 52 (e.g., an air seeder, sprayer, or applicator) and a commodity (e.g., seed) cart 54. Again, the towed implement 52 and the commodity cart 54 are considered types of work vehicles herein, in accordance with the previously assigned definition. A physical connection 56 joins the tractor 50 to the towed implement 52 and may include any number of hydraulic, pneumatic, or electrical connections for providing hydraulic fluid, pressurized air, power, or electrical signals to componentry located onboard the towed implement 52. Similarly, a physical connection 58 joins the towed implement 52 to the commodity cart 54 and may again include any number of hydraulic, pneumatic, or electrical connections. In embodiments in which the towed implement 52 assumes the form of an air seeder, seed may be received form the commodity cart 54 along with pressurized airstreams in which the seed (and possibly other material) is entrained. Comparatively, electrical power and/or command signals may be provided to the air seeder by a controller or other processing architecture onboard the tractor 50.

As represented in FIG. 2 by boxes 62 and 64, the vehicle reduction drive assembly 10 may be integrated into the towed implement 52 and/or the commodity cart 54, respectively, to provide a powered axle assist function. In such an application, the work vehicle reduction drive assembly 10 provides supplemental motive power by driving rotation of certain ones of the wheels 66 of the towed implement 52 (when implemented as powered axle 62) and/or provides supplemental motive power by driving rotation of certain ones of the wheels 68 of the commodity cart 54 (when implemented as a powered axle 64). This may enable the tractor 50 to tow the towed implement 52 and the commodity cart 54 at a higher rate of speed without slippage of the wheels 66, 68 for increased efficiency. Additionally or alternatively, furnishing the towed implement 52 and/or the commodity cart 54 with an independently powered axle may enable the wingspan of the towed implement 52 and/or the dimensions of the commodity cart 54 to be enlarged for further efficiency improvements; e.g., by enabling broader swathes of land to be seeded or treated per pass of the towed implement 52. When assuming the form of such a power assist axle 62, 64, the vehicle reduction drive assembly 10 may be integrated into the towed implement 52 or the commodity cart 54 during original manufacture. Alternatively, the vehicle reduction drive assembly 10 may be offered as aftermarket kit (a trailer traction kit), which can be retrofit onto the towed implement 52 and/or the commodity cart 54 following original manufacture. In still other implementations, embodiments of the vehicle reduction drive assembly 10 may be integrated into one or more of the work vehicles 50, 52, 54 in another manner; e.g., as indicated in FIG. 2 by box 70, a vehicle reduction drive assembly 10 may be integrated into the tractor 50 as, for example, a starter-generator, which assists in startup of the tractor engine and, after engine startup, then functions as an electrical generator.

FIGS. 3 and 4 are isometric and partial cross-sectional views, respectively, of an example implementation 72 of the generalized work vehicle reduction drive assembly 10 shown in FIG. 1 (hereafter referred to as "the work vehicle reduction drive assembly 72"). In this embodiment, the work vehicle reduction drive assembly 72 includes an e-machine 74 having electrical (power and signal) connections 76, a stator (hidden from view), and a rotor (also hidden from view) mounted to a motor shaft 82 (generically shown in phantom). The motor shaft 82 is, in turn, mechanically coupled to a mechanical input member 84 of a planetary gear train 86 contained in a gearbox housing 88, 90 having a main body 88 and a cover piece 90. Collectively, the planetary gear train 86 and the gearbox housing 88, 90 form a high contact ratio, configurable gearbox reduction 92. The mechanical input member 84 of the planetary gear train 86 is a sun gear in this example and is consequently referred to hereafter as the "sun gear 84." In addition to the sun gear 84, the planetary gear train 86 includes a ring gear 94 and a planet-carrier assembly 96 (FIG. 4). The planet-carrier assembly 96 contains four planet gears 98, which are each rotatably mounted to a carrier 100. The gearbox reduction 92 further contains various other components, such as ball bearings 102 supporting the rotating components of the gearbox reduction 92 and a breather port 104. The ring gear 94, the sun gear 84, and the planet gears 98 may all assume the form of non-helical spur gears.

The term "carrier," as appearing herein, is defined as any structure supporting multiple planet gears, while permitting rotation of the planet gears, and regardless of whether the carrier itself rotates about a central rotational axis of the planetary gear train. In the example illustrated in FIGS. 3 and 4, the carrier 100 is a non-rotatable structure, which may be integrally formed with the housing of the breather port 104, as shown. Comparatively, the ring gear 94 is rotatable about a central rotation axis 106 of the planetary gear train 86 in the illustrated example. Additionally, the ring gear 94 is mechanically linked to an output shaft 108 through a ring gear support structure 78 and splined interface 80. This structural arrangement thus provides co-rotation of the ring gear 94, the ring gear support structure 78, and the output shaft 108, as further described below.

The rotational power flow through the gearbox reduction 92 is as follows. Rotation of the motor shaft 82 drives co-rotation of the sun gear 84, which may be mounted to the motor shaft 82 in a rotationally-fixed relationship (e.g., via a spline coupling, as shown). Rotation of the sun gear 84 drives rotation of the planet gears 98. As stated above, the carrier 100 is rotationally fixed in the illustrated example such that rotation of the planet gears 98 drives rotation of the ring gear 94 (rather than rotation of the carrier 100) about the central rotation axis 106 (FIG. 4). The ring gear 94 serves as the mechanical output of the planetary gear train 86, with rotation of the ring gear 94 imparted to the output shaft 108 of the gearbox reduction 92. Again, the output shaft 108 is coupled to the ring gear 94 in a rotationally-fixed relationship via the ring gear support structure 78 and the splined interface 80 between the inner circumference of the support structure 78 and an outer circumference of an end of the shaft 108, as previously noted. A non-illustrated shaft may therefore be joined to the splined shaft 108 to mechanically link the work vehicle reduction drive assembly 72 to a movable component or device designed to perform a work vehicle function. For example, in embodiments, the splined shaft 108 may be mechanically coupled to the rotatable wheel hubs of a work vehicle when the work vehicle reduction drive assembly 72 is integrated into a power assist axle device or kit, as described above. Also, in such an embodiment, the gearbox reduction 92 may be imparted with a rotation speed reduction ratio of approximately 3.19 to serve as a pi drive well-suited for replacing a hydraulic motor, which may otherwise be utilized for such a function.

In keeping with the foregoing description, the ring gear 94 of the planetary gear train 86 is imparted with a tooth count of $T_{ring}$, the sun gear 84 is imparted with a tooth count $T_{sun}$, and each of the planet gears 98 is imparted with a tooth count $T_{planet}$; wherein $T_{ring}$, $T_{sun}$, and $T_{planet}$ are selected or designed in keeping with the design rules or critical numerical relationships described in detail above. For example, in various embodiments, $T_{ring}$, $T_{sun}$, and $T_{planet}$ are selected such that the planet gears 98 each contact at least two teeth of the sun gear 84 and at least two teeth of the ring gear 94 in all rotational positions of the planetary gear train 86. Further, the sum of $T_{ring}$ and $T_{sun}$ yields a positive integer when divided by a first number from a set {3, 4, 5} and when divided by a second number from the set {3, 4, 5} different than the first number. Additionally, in at least some embodiments, $T_{ring}$ is selected as a prime number exceeding 100; and, perhaps, $T_{ring}$ is selected from the number set {113, 119, 121, 127, 131, 137, 139}, with $T_{sun}$ then selected from the various number sets set-forth above in connection with TABLES 1A through 1G. Further, in various implementations, $T_{ring}$ may be selected to be a prime number exceeding 100, while $T_{sun}$ is selected to be greater than 26 and less than $T_{ring}$.

Figure 5:
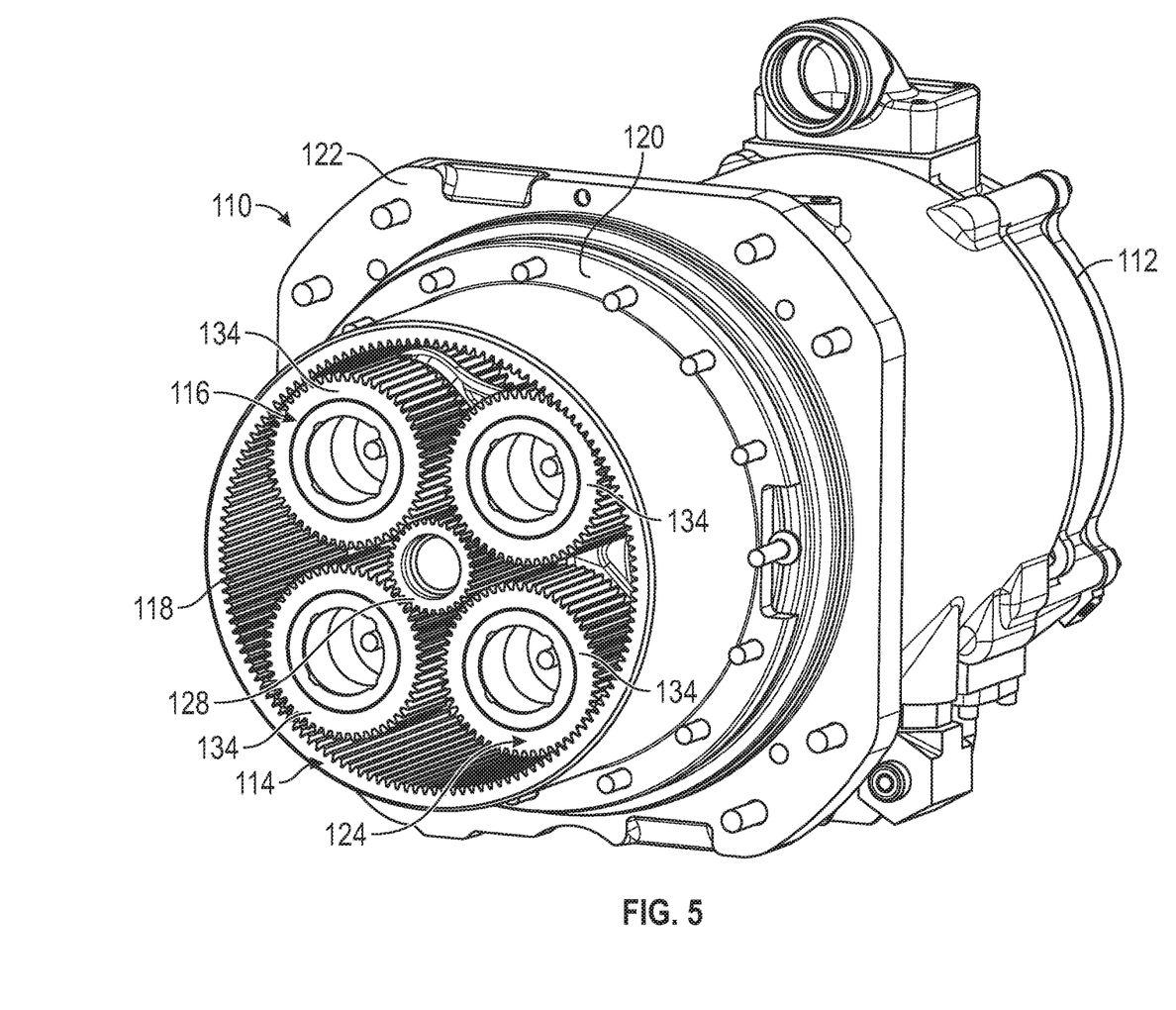
FIGS. 5 and 6 are isometric views of a second example implementation of the generalized work vehicle reduction drive assembly shown in FIG. 1 including a high contact ratio, configurable gearbox reduction containing a multi-stage planetary gear train (the ring gear of which is hidden from view in FIG. 6).
Figure 6:
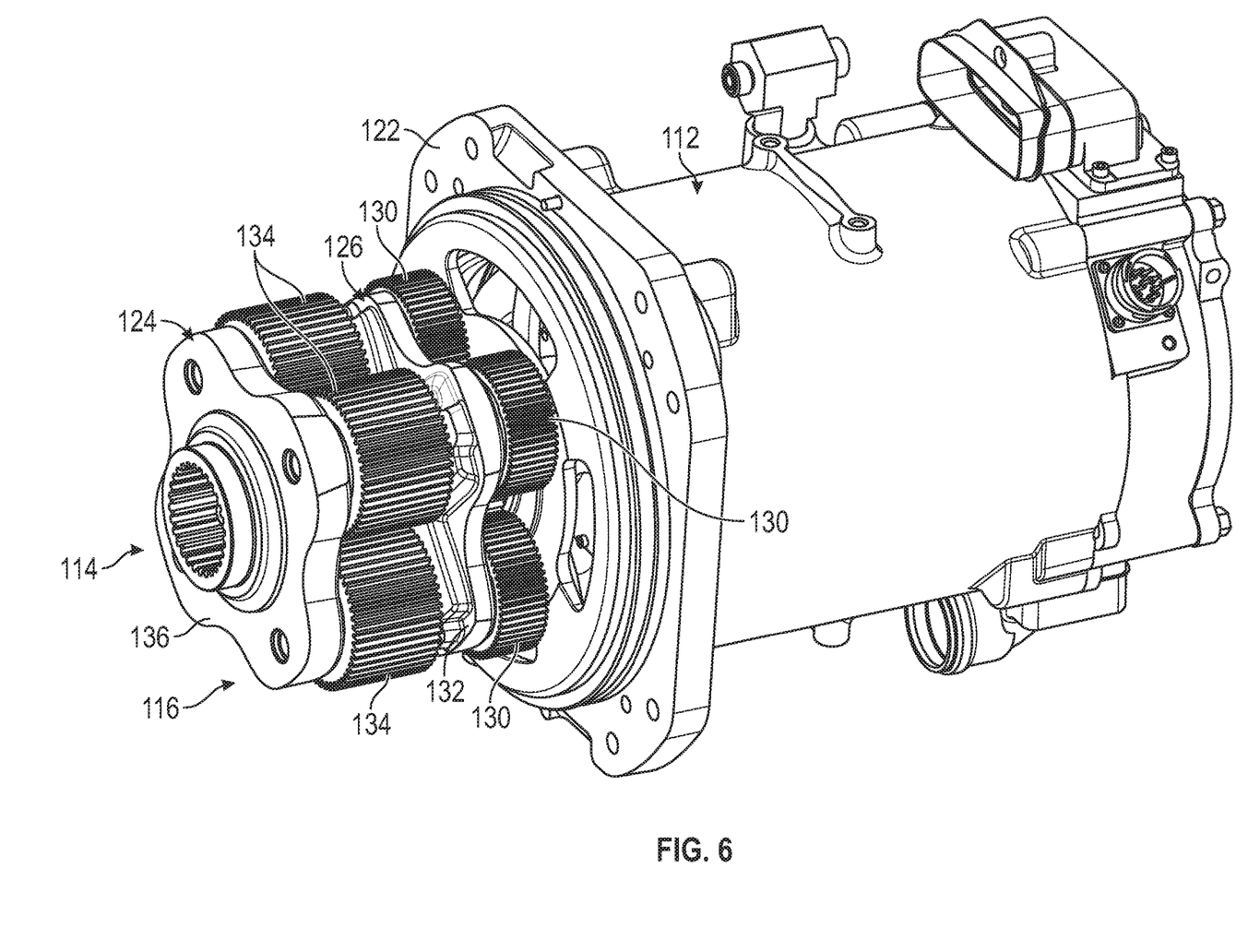

A second, non-limiting example implementation of a work vehicle reduction drive assembly 110 is shown in FIGS. 5 and 6. As was previously the case, the work vehicle reduction drive assembly 110 includes a drive (here, an e-machine 112) and a high contact ratio, configurable gearbox reduction 114. The gearbox reduction 114 includes, in turn, a non-illustrated gearbox housing in which a planetary gear train 116 is disposed. In contrast to the planetary gear train 86 (FIGS. 3 and 4), however, the planetary gear train 116 contains a ring gear 118, two planet-carrier assemblies 124, 126, and two sun gears 128 (one of which can be seen in FIG. 5). The planetary gear train 116 of the work vehicle reduction drive assembly 110 is thus a compound or multi-stage planetary gear set in this latter embodiment. Additionally, the ring gear 118 remains rotationally-fixed or stationary when rotation of the planetary gear train 116 is driven by the e-machine 112; e.g., as best shown in FIG. 5, the ring gear 118 may be formed by the toothed inner periphery of a tubular-shaped color or piece 120, which is bolted or otherwise rotationally affixed to a flange 122 of the e-machine 112.

The power flow through the planetary gear train 116. First, rotation of the output shaft of the e-machine 112 results in rotation of the first stage sun gear (hidden from view), which meshes with the planet gears 130 included in the planet-carrier assembly 126. This causes rotation of the planet gears 130 and rotation of a carrier 132 further included in the planet-carrier assembly 126. The carrier 132 is rotationally fixed to the second stage sun gear 128 (FIG. 5), which corotates with the carrier 132. Rotation of the second stage sun gear 128 further drives rotation of the planet gears 134, and therefore the carrier 136, included within the planet-carrier assembly 124. The carrier 136 of the planet-carrier assembly 124 then serves as the mechanical output of the planetary gear train 116 and, when the work vehicle reduction drive assembly 110 is integrated into a work vehicle, is coupled to a shaft (or other rotatable member) in a rotationally-fixed relationship utilizing, for example, a splined coupling. Imparting the planetary gear train 116 with a multi-stage design in this manner enables the speed reduction ratio of the gearbox reduction 114 to be increased; e.g., the speed reduction ratio of the gearbox reduction 114 is equivalent to the product of the ratio reduction provided by the first stage of the planetary gear train 116 multiplied by the ratio reduction provided by the second stage of the planetary gear train 116. Again, all of the gears within the planetary gear train 116 may be non-helical spur gears.

Once again, the respective tooth counts of the ring gear 118, each planet gear 130, each planet gear 134, and the sun gears 128 is advantageously selected in accordance with the design principals disclosed throughout this document. Accordingly, in embodiments, the ring gear 118 may be imparted with a tooth count of $T_{ring}$, with $T_{ring}$ selected as a prime number exceeding 100 and possibly selected from the number set {113, 119, 121, 127, 131, 137, 139}. The tooth count of the first stage and second stage sun gears 128 may be identical or may instead vary; however, the tooth count of each sun gear 128 may be selected from the various number sets set-forth above in connection with TABLES 1A through 1G. The respective tooth counts of the ring gear 118, each planet gear 130, each planet gear 134, and the sun gears 128 may further be selected to: (i) provide a high contact ratio, as previously described; and/or (ii) such that the sum of the tooth count of the ring gear 118 added to the tooth count of either of the sun gears 128 yields a positive integer when divided by a first number from a set {3, 4, 5} and when divided by a second number from the set {3, 4, 5} different than the first number. Finally, in at least some cases, $T_{ring}$ may be selected to be a prime number exceeding 100, while the tooth count of one or both of the sun gears 128 is selected to be greater than 26 and less than $T_{ring}$. A high contact ratio, quiet, low transmission gearbox reduction 114 is thus provided, which is amenable to relatively low cost manufacture. The gearbox reduction 114 also possesses the above-described modularity or interchangeability such that either or both of the planetary gear sets 130, 134 can be interchanged for planetary gear sets having similar critical dimensions, but varying in planet count as previously discussed. Additionally, as the planetary gear train 116 contains only spur gears (while still achieving a high contact ratio), manufacturing costs are reduced, while thrust loads are minimized to prolong the service lifespan of the bearings of the configurable gearbox reduction 114.

Enumerated Examples of the Work Vehicle Reduction Drive Assembly

The following examples of the example work vehicle reduction drive assembly are further provided and numbered for ease of reference.

1. In a first example embodiment, a work vehicle reduction drive assembly is utilized onboard a work vehicle having a movable work component. The work vehicle reduction drive assembly includes a high contact ratio, configurable gearbox reduction and a drive. The gearbox reduction includes, in turn, a gearbox housing and a planetary gear train within the gearbox housing. The planetary gear train contains a ring gear, a sun gear, and a planet-carrier assembly including a plurality of planet gears. The drive is mechanically linked to the movable work component through the planetary gear train when the work vehicle reduction drive assembly is deployed onboard the work vehicle. The ring gear has a tooth count of $T_{ring}$, the sun gear has a tooth count of $T_{sun}$, and the plurality of planet gears each have a tooth count of $T_{planet}$. Further, $T_{ring}$, $T_{sun}$, and $T_{planet}$ are selected such that the plurality of planet gears each contact at least two teeth of the sun gear and at least two teeth of the ring gear in all rotational positions of the planetary gear train. Finally, the sum of $T_{ring}$ and $T_{sun}$, yields a positive integer when divided by a first number from a set {3, 4, 5} and when divided by a second number from the set {3, 4, 5} different than the first number.

2. The work vehicle reduction drive assembly of example 1, wherein $T_{ring}$, $T_{sun}$, and $T_{planet}$ are further selected such that the planetary gear train provides a rotational speed reduction ratio exceeding three.

3. The work vehicle reduction drive assembly of example 1, wherein $T_{ring}$, $T_{sun}$, and $T_{planet}$ are further selected such the ring gear, the sun gear, and the plurality of planet gears follow a hunting pattern during operation of the work vehicle reduction drive assembly.

4. The work vehicle reduction drive assembly of example 1, wherein $T_{ring}$ is a prime number exceeding 100.

5. The work vehicle reduction drive assembly of example 4, wherein $T_{ring}$ is selected from a set {113, 119, 121, 127, 131, 137, 139}.

6. The work vehicle reduction drive assembly of example 5, wherein $T_{ring}$ is 113; and wherein $T_{sun}$ is selected from the set {27, 31, 37, 43, 47, 52, 55}.

7. The work vehicle reduction drive assembly of example 5, wherein $T_{ring}$ is 119; and wherein $T_{sun}$ is selected from the set {31, 37, 41, 46, 49}.

8. The work vehicle reduction drive assembly of example 5, wherein $T_{ring}$ is 121; and wherein $T_{sun}$ is selected from the set {29, 35, 39, 44, 47}.

9. The work vehicle reduction drive assembly of example 5, wherein $T_{ring}$ is 127; and wherein $T_{sun}$ is selected from the set {29, 33, 38, 41, 53}.

10. The work vehicle reduction drive assembly of example 5, wherein $T_{ring}$ is 131; and wherein $T_{sun}$ is selected from the set {29, 34, 37, 49}.

11. The work vehicle reduction drive assembly of example 5, wherein $T_{ring}$ is 137; and wherein $T_{sun}$ is selected from the set {28, 31, 43, 55, 58}.

12. The work vehicle reduction drive assembly of example 5, wherein $T_{ring}$ is 139; and wherein $T_{sun}$ is selected from the set {29, 41, 53, 56}.

13. The work vehicle reduction drive assembly of example 1, wherein the ring gear, the sun gear, and the plurality of planet gears include spur gears.

14. The work vehicle reduction drive assembly of example 1, wherein the movable work component assumes the form of a propulsive element of the work vehicle, while the drive assumes the form of an e-machine. The e-machine is mechanically linked to a propulsive element when the work vehicle reduction drive assembly is deployed onboard the work vehicle.

15. The work vehicle reduction drive assembly of example 14, wherein the propulsive element assumes the form of a powered axle of the work vehicle.

Conclusion

There has thus been provided embodiments of work vehicle reduction drive assemblies including high contact ratio, configurable gearbox reductions. The work vehicle reduction drives, such as work vehicle reduction e-drives, are capable of fabrication at lowered manufacturing costs and complexities. Additionally, the work vehicle reduction drives described above provide other benefits, including flexible or configurable designs. Embodiments of the work vehicle reduction drives further minimize transmission errors and noise production, which may improve operator experience (particularly when incorporating an e-machine otherwise capable of providing quiet operation). As a still further advantage, embodiments of the work vehicle reduction e-drive include relatively compact gearbox reductions, which reduce bearing wear and otherwise prolong the operational lifespan of the gearbox components. The work vehicle reduction drives are thus well-suited for usage in performing various work vehicle functions. As indicated by the term "configurable," the above-described gearbox reductions provide design flexibility enabling varying sun-planet combinations (that is, different combinations of sun gears paired with planet-carrier assemblies having varying numbers of planet gears) to be utilized with a common ring gear (and, perhaps, a common base structure including the ring gear and casing). In this manner, manufacturing costs can be reduced, while manufacturing processes are streamlined through the usage of common parts across different configurations of the gearbox reduction.

As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A work vehicle reduction drive assembly utilized onboard a work vehicle having a movable work component, the work vehicle reduction drive assembly comprising:
   a high contact ratio, configurable gearbox reduction, comprising:
      a gearbox housing; and
      a planetary gear train within the gearbox housing, the planetary gear train comprising a ring gear, a sun gear, and a planet-carrier assembly including a plurality of planet gears; and
   a drive mechanically linked to the movable work component through the planetary gear train when the work vehicle reduction drive assembly is deployed onboard the work vehicle;
   wherein the ring gear has a tooth count of $T_{ring}$, the sun gear has a tooth count of $T_{sun}$, and the plurality of planet gears each have a tooth count of $T_{planet}$;
   wherein $T_{ring}$, $T_{sun}$, and $T_{planet}$ are selected such that the plurality of planet gears each contact at least two teeth of the sun gear and at least two teeth of the ring gear in all rotational positions of the planetary gear train; and
   wherein the sum of $T_{ring}$ and $T_{sun}$ yields a positive integer when divided by a first number from a set {3, 4, 5} and when divided by a second number from the set {3, 4, 5} different than the first number.

2. The work vehicle reduction drive assembly of claim 1, wherein $T_{ring}$, $T_{sun}$, and $T_{planet}$ are further selected such that the planetary gear train provides a rotational speed reduction ratio exceeding three.

3. The work vehicle reduction drive assembly of claim 1, wherein $T_{ring}$, $T_{sun}$, and $T_{planet}$ are further selected such the ring gear, the sun gear, and the plurality of planet gears follow a hunting pattern during operation of the work vehicle reduction drive assembly.

4. The work vehicle reduction drive assembly of claim 1, wherein $T_{ring}$ is a prime number exceeding 100.

5. The work vehicle reduction drive assembly of claim 4, wherein $T_{ring}$ is selected from a set {113, 119, 121, 127, 131, 137, 139}.

6. The work vehicle reduction drive assembly of claim 5, wherein is 113; and
   wherein $T_{sun}$ is selected from the set {27, 31, 37, 43, 47, 52, 55}.

7. The work vehicle reduction drive assembly of claim 5, wherein $T_{ring}$ is 119; and
   wherein $T_{sun}$ is selected from the set {31, 37, 41, 46, 49}.

8. The work vehicle reduction drive assembly of claim 5, wherein is 121; and
   wherein $T_{sun}$ is selected from the set {29, 35, 39, 44, 47}.

9. The work vehicle reduction drive assembly of claim 5, wherein $T_{ring}$ is 127; and
   wherein $T_{sun}$, is selected from the set {29, 33, 38, 41, 53}.

10. The work vehicle reduction drive assembly of claim 5, wherein $T_{ring}$ is 131; and
    wherein $T_{sun}$ is selected from the set {29, 34, 37, 49}.

11. The work vehicle reduction drive assembly of claim 5, wherein $T_{ring}$ is 137; and
    wherein $T_{sun}$, is selected from the set {28, 31, 43, 55, 58}.

12. The work vehicle reduction drive assembly of claim 5, wherein $T_{ring}$ is 139; and
    wherein $T_{sun}$, is selected from the set {29, 41, 53, 56}.

13. The work vehicle reduction drive assembly of claim 1, wherein the ring gear, the sun gear, and the plurality of planet gears comprise spur gears.

14. The work vehicle reduction drive assembly of claim 1, wherein the movable work component comprises a propulsive element of the work vehicle; and
    wherein the drive comprises an e-machine, which is mechanically linked to a propulsive element when the work vehicle reduction drive assembly is deployed onboard the work vehicle.

15. The work vehicle reduction drive assembly of claim 14, wherein the propulsive element comprises a powered axle of the work vehicle.

16. The work vehicle reduction drive assembly of claim 14, wherein the propulsive element comprises a drive sprocket included in a tracked undercarriage of the work vehicle.

17. The work vehicle reduction drive assembly of claim 1, wherein the movable work component comprises a diesel engine onboard the work vehicle and having an engine shaft; and
    wherein the drive comprises an e-machine mechanically linked to the engine shaft when the work vehicle reduction drive assembly is deployed onboard the work vehicle, the e-machine configured to urge rotation of the engine shaft during engine startup and to act as a generator when back-driven by the engine shaft following engine startup.

18. The work vehicle reduction drive assembly of claim 1, wherein the ring gear has an inner diameter ranging from about 127 millimeters to about 305 millimeters.

19. A work vehicle reduction drive assembly utilized onboard a work vehicle having a movable work component, the work vehicle reduction drive assembly comprising:
    a high contact ratio, configurable gearbox reduction, comprising:
       a gearbox housing; and
       a planetary gear train, comprising:
          a ring gear having a tooth count of $T_{ring}$, wherein $T_{ring}$ is a prime number exceeding 100;
          a sun gear having a tooth count of $T_{sun}$, wherein $T_{sun}$ is greater than 26 and less than $T_{ring}$; and
          a planet-carrier assembly including a plurality of planet gears each having a tooth count of $T_{planet}$, wherein $T_{planet}$ combines with $T_{ring}$ and $T_{sun}$, to impart the planetary gear train with a speed reduction ratio exceeding three; and
    a drive having a drive shaft, the drive shaft mechanically linked to the movable work component through the planetary gear train when the work vehicle reduction drive assembly is deployed onboard the work vehicle.

20. The work vehicle reduction drive assembly of claim 19, wherein $T_{ring}$ is selected from the set {113, 119, 121, 127, 131, 137, 139}; and
    wherein $T_{sun}$ is selected from the set {27, 28, 29, 31, 33, 34, 35, 37, 38, 39, 41, 43, 44, 46, 47, 49, 52, 53, 55, 56, 58}.

* * * * *

UNITED STATES PATENT AND TRADEMARK OFFICE
CERTIFICATE OF CORRECTION

PATENT NO. : 11,060,589 B2  
APPLICATION NO. : 16/668471  
DATED : July 13, 2021  
INVENTOR(S) : Base et al.

Page 1 of 1

It is certified that error appears in the above-identified patent and that said Letters Patent is hereby corrected as shown below:

In the Claims

In Column 19, Claim 6, Line 51, delete "is" and insert -- Tring is --, therefor.

In Column 19, Claim 8, Line 58, delete "is" and insert -- Tring is --, therefor.

In Column 19, Claim 9, Line 62, delete "Tsun'" and insert -- Tsun --, therefor.

In Column 20, Claim 11, Line 3, delete "Tsun'" and insert -- Tsun --, therefor.

In Column 20, Claim 12, Line 6, delete "Tsun'" and insert -- Tsun --, therefor.

In Column 20, Claim 19, Line 52, delete "Tsun'" and insert -- Tsun --, therefor.

Signed and Sealed this  
Twenty-third Day of November, 2021

Drew Hirshfeld  
*Performing the Functions and Duties of the*  
*Under Secretary of Commerce for Intellectual Property and*  
*Director of the United States Patent and Trademark Office*